June 16, 1931.  J. HINES  1,810,351
FASTENING DEVICE
Filed Nov. 2, 1928
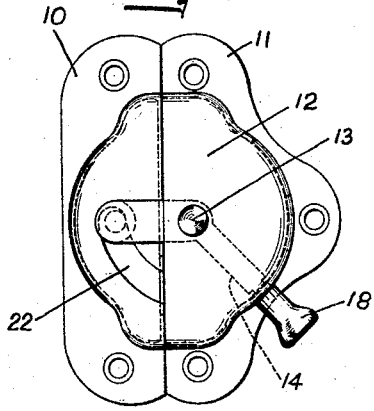
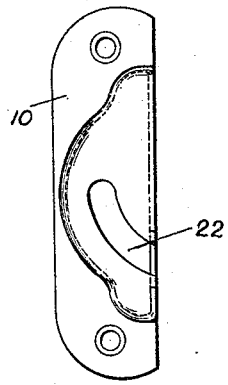
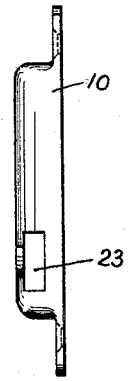
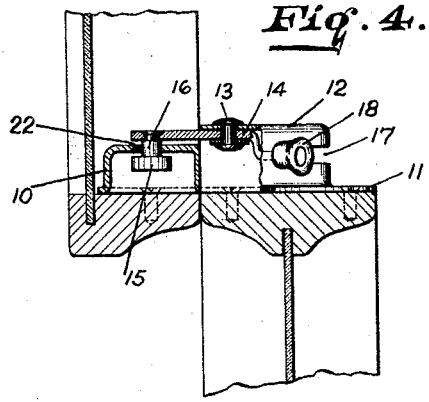
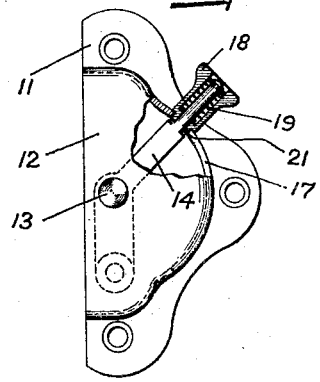
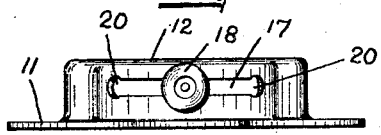
INVENTOR.
John Hines
BY
ATTORNEYS.

Patented June 16, 1931

1,810,351

UNITED STATES PATENT OFFICE

JOHN HINES, OF ASTORIA, NEW YORK, ASSIGNOR TO SEGAL LOCK & HARDWARE CO., INC., OF NEW YORK, N. Y., A CORPORATION OF NEW YORK

FASTENING DEVICE

Application filed November 2, 1928. Serial No. 316,637.

This invention relates to a fastening device, capable of use in numerous different associations but particularly intended to be applied in connection with the fastening of window sash.

It is an object of the invention to provide a device of this character which, upon being thrown to operative position, may automatically assume a locked condition.

A further object of the invention is that of furnishing a device of this type which will serve, if desired, to not alone secure two members with which it is associated against relative movement, but it will also serve to draw such members towards each other and into sealing contact.

An additional object is that of furnishing a lock or fastening device, the parts of which will be relatively few in number and individually simple and rugged in construction, these parts being largely capable of being manufactured by automatic machinery, and furthermore, lending themselves to ready assemblage by relatively unskilled labor, so that an article of this nature is provided operating over long periods of time with freedom from mechanical difficulties, and capable of being manufactured at relatively nominal cost.

With these and further objects in mind, reference is had to the attached sheet of drawings illustrating one practical embodiment of the invention, and in which:

Figure 1 is a plan view of the fastener parts, and showing the same in operative relation;

Fig. 2 is a similar view of the keeper element;

Fig. 3 is a face view thereof;

Fig. 4 is a partly sectional side view of the parts as shown in Fig. 1, and illustrating the fastener as applied to window sash;

Fig. 5 is a partly sectional plan view of the bolt member of the fastening device; and Fig. 6 is an edge view of the latter.

In these views, the reference numerals 10 and 11 indicate the keeper element and bolt-housing member respectively. Each of these members is preferably formed with a centrally bulged portion, as at 12, and certain of the edges of these portions are preferably complementary to each other, as has been clearly brought out in Figs. 1 and 4. Associated with the member 11, and mounted preferably centrally thereof by means of a pivot pin 13, is a bolt including a bell-crank lever 14, having at the end of its free arm a head 15 formed with a reduced portion 16. The second arm of this lever rides within, and extends beyond, a slot 17 formed in the outer edge of the bulged portion, and a knob 18 may be carried by this arm and is normally pressed inwardly by means of a spring 19.

As shown in Fig. 6, the ends of the slot 17 are preferably enlarged, as at 20, in order to accommodate the reduced inner end portion 21 of the knob, it being thus apparent that as the outer arm of the bell-crank lever is swung to either of its extreme positions, the knob, under the influence of the spring, will ride within the enlarged portions 20 and thus prevent any further manipulation of the lever until the knob has been retracted to have its reduced portion 21 withdrawn from the enlarged ends 20 of the slot. Thereupon, it will be apparent that if the lever is swung to its opposite extreme position, the knob will be automatically projected as soon as the reduced end portion thereof comes in line with the enlarged part of the slot. Now with a view to coupling the members 10 and 11 when the fastening device is in operative position, it will be observed that the bulged portion 12 of the member 10 presents an arcuate slot 22, it being here noted that the degree of curvature of this slot is preferably such that a camming action is exerted by the bolt. In other words, the path of this slot is not that of an arc of a circle having as its center the pivot pin 13. As a consequence, when the lever 14 is rocked, the bolt head will freely enter the slot through the enlarged forward end 23 thereof, but the reduced portion of the bolt will cam against the slot edge, resulting in the complementary portions of the members 10 and 11 being drawn into intimate contact. Thus it will be seen that if the members 10—11 are affixed one to each of, for example, a pair of sash members, these members will be drawn towards each other, and a rattling thereof incident to air pressures will be normally prevented.

Furthermore, it will be apparent that even if an implement is forced between the sash members, the bolt may not be retracted, due to the locking expedient resorted to, and furthermore, these sash members may not be forced to raised or lowered positions by virtue of the enlarged head of the bolt provided to prevent this result.

From the foregoing it will be appreciated that, among others, the several objects specifically aforementioned are achieved. It will, furthermore, be understood that numerous changes in construction, and rearrangement of the parts, might be resorted to without in the slightest departing from the spirit of the invention as described by the claims.

Having described my invention, what I claim as new and desire to secure by Letters Patent is:

1. A fastening device including a pair of sheet metal members of substantially constant gauge, a lever pivotally carried by one of said members, the second of said members being formed with a slot eccentrically disposed with respect to the point of pivotal connection of said lever, and means carried by said lever to ride within said slot.

2. A fastening device including a pair of members, a lever pivotally carried by one of said members, a bolt carried by said lever and the second of said members being formed with a slot to receive said bolt, said bolt having a head portion extending beyond said slot and a reduced portion riding within the same, and said slot having an enlarged open end for the passage of said head.

3. A fastening device including a pair of members, a lever pivotally mounted by one of said members, means carried by said lever and cooperating with the second of said members to couple both of said members against relative movement, a slot formed in the lever-carrying member and through which the end of said lever extends, and a spring-pressed knob carried by that end of the lever which extends through said slot and cooperative with the edge portions of said slot to prevent movement of said lever with respect to the member with which it is associated.

4. A fastening device including a pair of casing members, a bulged portion forming a part of each of said members, a lever pivotally carried within the bulged portion of one of said members, the second of said members being formed with a slot eccentrically disposed with respect to said lever pivot, a bolt head carried by said lever and having a reduced portion riding within said slot, and the bulged portion of said first member being also formed with a slot through which the outer end of said lever extends.

5. A fastening device including a pair of sheet metal members comprising bodies and bulged portions forming a part of said bodies, a cooperating lever and slot structure associated with said members, one of the parts of said structure being eccentrically disposed with respect to the second of the same whereby as said lever is shifted along said slot, the members will be drawn into intimate contact and retained against movement with respect to each other.

6. A fastening device including a pair of members, bulged portions forming a part of each of said members, a lever secured to one of said members, the second of said members being formed with a slot for cooperation with said lever in order to retain the members against movement when said lever is shifted to a predetermined position, the lever mounting member being formed with a slot in the side of its bulged portion, and enlarged parts adjacent the ends of said slot, the end of said lever extending through said slot, and a spring pressed knob associated with the end of said lever and projectable into said enlarged portions to prevent a shifting of said lever.

7. A fastening device including a pair of sheet metal members, one formed with a slot, a bulged portion forming a part of the second of said members, a lever pivotally secured to the inner face of such portion and extending through a slot in the side wall of such portion to permit of manipulation, the body of said lever being housed within said portion, the side wall of said portion being formed with a slot for the passage of the lever end, a head carried by the outer end of said lever and riding within the slot in said first mentioned member, and said slot being formed with an enlarged portion for the accommodation of said head.

8. A fastening device including a pair of sheet metal members, one formed with a slot, a bulged portion forming a part of the second of said members, a lever pivotally secured to the inner face of such portion and extending through a slot in the side wall of such portion to permit of manipulation, the body of said lever being housed within said portion, the side wall of said portion being formed with a slot for the passage of the lever end, a head carried by the outer end of said lever and riding within the slot in said first mentioned member, and said slot being formed with an enlarged portion for the accommodation of said head, and a lever retaining means associated with the first named end of the lever and bearing against the edges of the slot through which such end of the lever extends.

9. A fastening device including a pair of casing members, a lever pivoted within one of said members and having the end of one arm extending through a slot in such member whereby said member may be manipulated, the second casing member being formed with a slot eccentrically disposed with reference to the point of pivotal mounting of said lever, a head including an enlarged outer portion and a reduced inner portion attached to said lever and said reduced portion riding within said latter slot.

In testimony whereof I affix my signature.

JOHN HINES.